Patented Jan. 16, 1940

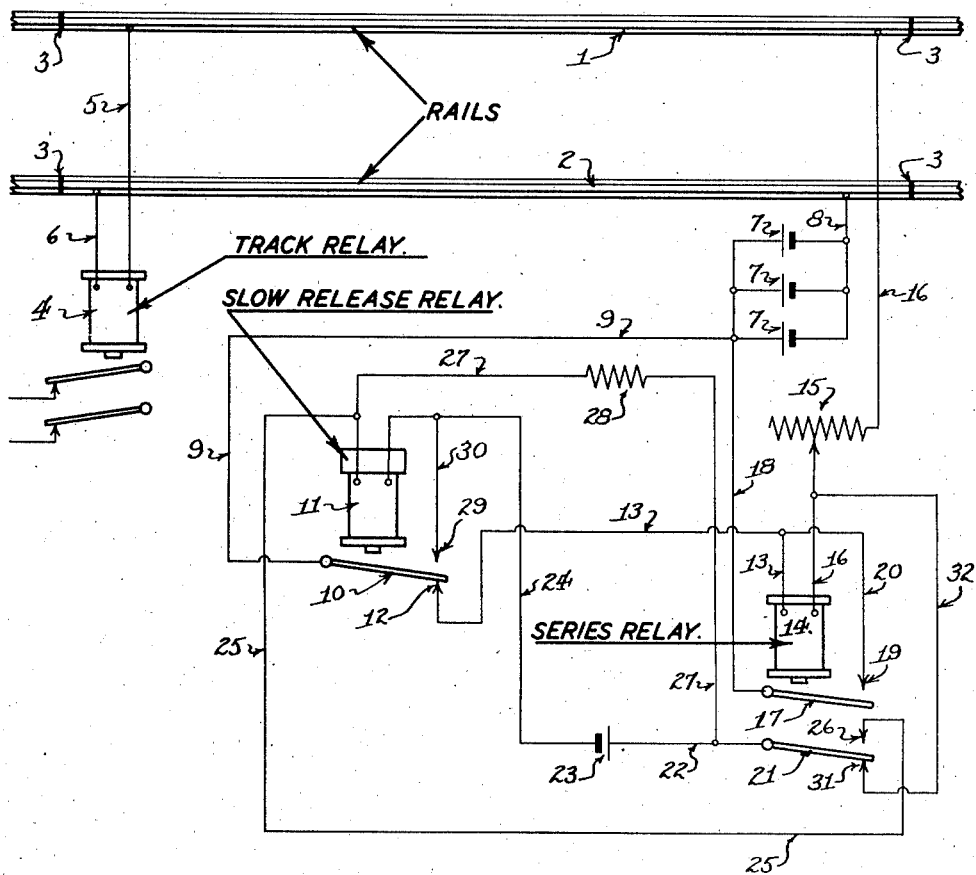

2,187,225

UNITED STATES PATENT OFFICE 2,187,225

IMPULSE TRACK CIRCUIT

David W. Dower, Burlingame, and Augustus W. Clark, Albany, Calif.

Application July 9, 1938, Serial No. 218,386

2 Claims. (Cl. 246—41)

The present invention relates to track circuits for railway signal systems.

The essential elements of such a circuit are the two rails of the track, a low-voltage closed circuit battery connected across the rails, and a track relay also connected across said rails. The contacts operated by the armature of the track relay control the operation of whatever signal may be used. As long as the particular block or section of track included in the circuit is unoccupied, the track relay is energized or "picked-up" by the battery current and the signal indicates clear. However when a train enters the block, its wheels and axles offer a low resistance shunt across the rails, thereby releasing the relay and causing the signal to show danger. A current limiting resistance is usually included in the circuit to prevent excessive drain on the battery when the track is shunted by the train.

Successful operation of track circuits of this type are affected by several factors, especially the length of the block, the resistance of the rails and rail joints and the "ballast resistance" or shunting effect of the track ballast. The latter is particularly troublesome, as it is not directly controllable, and may vary in value from infinity to .15 ohm or less, which is only about two and one-half times as great as the resistance of the poorest train shunt.

The principal object of the present invention is to provide an improved track circuit in which the shunting sensitivity is increased and positive operation of the track relay is assured even under adverse conditions of ballast and rail resistance, and even in blocks of greater than usual length. The chief consideration of any railway signal system is the reliability of operation. Positive and unfailing operation of the danger signal and elimination of any possible showing of a false clear signal, are essential to safety. On the other hand, a false danger signal is disturbing and objectionable. Our improved track circuit is so arranged that both danger and clear signals will be both positive and reliable, and false clear signals cannot be given, even under the most adverse track conditions encountered in railway operation.

Another object of the invention is to conserve battery current, and hence increase battery life. A further object is to provide a circuit which requires no very fine or close adustments to keep it in proper working condition. Still other objects and advantages of the invention will be apparent from the following description of a simple and typical circuit embodying the invention, which description should be read with the understanding that changes may be made, within the limits of the claims hereto appended, without departing from the spirit of the invention.

The single figure of the drawing is a diagram of a simple circuit embodying the invention.

The track has rails 1 and 2 constituting a section or block insulated from adjacent track sections by insulated joints 3. Near one end of the block the signal or track relay 4 has its winding connected across the two rails 1 and 2 by wires 5 and 6. The track relay 4 controls the operation of any suitable signal, not shown, in the usual manner. Near the other end of the block is a low-voltage closed circuit battery 7 of usual and suitable type for operating the track relay 4. One terminal of the battery 7 is connected with rail 2 by a wire 8. The other battery terminal is connected by a wire 9 with the armature contact 10 of a relay 11. The back contact 12 of this relay 11 is connected by a wire 13 with the winding of a relay 14. The other end of said winding is connected with the rail 1, through a variable current limiting resistance 15, by a wire 16. The relay 14 is in series in the track circuit.

The armature of the relay 14 has two moving contacts, one of which, 17, is connected by a wire 18 with one side of the battery 7, and has a front contact 19 connected by a wire 20 with the battery end of the winding of relay 14. Contacts 17—19 therefore shunt contacts 10—12 of relay 11 when relay 14 picks up.

The other armature contact 21 of relay 14 is connected by wire 22 with one terminal of an auxiliary low-voltage closed circuit battery 23, whose other terminal is connected by a wire 24 with one end of the winding of the relay 11. The other end of said winding is connected by a wire 25 with a front contact 26 of relay 14. Thus relay winding 11, auxiliary battery 23, and front contacts 21—26 of relay 14 are in series in an auxiliary circuit. As this circuit is normally open, a shunt is provided across contacts 21—26 by a wire 27 and a resistance 28, permitting the usual type of closed circuit signal battery to be used at 23. The current permitted to flow through winding of relay 11 by said shunt resistance 28 is less than the release constant of said relay 11, but when contacts 21—26 are closed by the pick-up of relay 14, relay 11 also picks up.

The front contact 29 of relay 11 is connected with auxiliary battery 23 by a wire 30 joining wire 24. The back contact 31 of relay 14 is connected by a wire 32 with the track side of the winding of said relay 14.

Relay 14 is a low resistance series relay, and is adjusted to pick up only when the track block is occupied and shunted by a train. Relay 11 is a slow release relay of common type. It picks up when relay 14 picks up and closes front contacts 21—26, but due both to its inherent characteristics and to the holding effect of the high resistance shunt 27—28, relay 11 does not release until after relay 14 has released.

Operation of the circuit is as follows: when the block is unoccupied, track or signal relay 4 is energized by current from battery 7 flowing in a circuit consisting of wire 8, rail 2, wire 6, relay winding 4, wire 5, rail 1, wire 16, resistance 15, winding of series relay 14, wire 13, back contacts 12 and 10 of relay 11, and wire 9 to battery 7.

When a train enters the block and shunts track relay 4, said track relay releases. At the same time, the current through series relay 14 is increased by the shunting of the winding of relay 4, so that series relay 14 picks up and closes its front contacts 17—19 and 21—26. This closing of contacts 21—26 closes the auxiliary circuit consisting of battery 23, wire 24, winding of relay 11, wire 25, contacts 26 and 21, and wire 22 to battery 23. Relay 11 therefore picks up, opening its back contacts 10—12, but this has no effect on the track circuit because said contacts 10—12 are shunted by front contacts 17—19 of series relay 14.

When the train runs off the block, removing its low resistance shunt across rails 1—2, track relay 4 picks up and series relay 14 releases. Due to the retarded release action of relay 11, there is a short interval of time after release of relay 14 and before the release of relay 11, during which the auxiliary battery 23 is in series with battery 7 in the track circuit, said track circuit then consisting of battery 7, wire 8, rails 2 and 1, and track relay 4, wire 16, resistance 15, wire 32, back contacts 31 and 21 of relay 14, wire 22, auxiliary battery 23, wires 24 and 30, front contacts 29 and 10 of slow-release relay 11 and wire 9 back to battery 7. As soon as slow-release relay 11 releases, the circuit is restored to its normal clear track condition as first described above.

Thus a momentary increased voltage, or impulse, resulting from the series connections of both batteries, is supplied in the track circuit at the instant the train shunt is removed, and this impulse is sufficient to positively insure the pick-up of track relay 4, even under extremely adverse conditions of rail and ballast resistance. The impulse has no effect on the series relay 14, because its winding is shunted by the series auxiliary circuit. Obviously, the polarity of the two batteries must be such that their voltages are cumulative when connected in series.

It will be seen that the circuit described above provides a maximum of safety and reliability, with the least practicable drain on the battery. On any block of track where the ballast resistance is sufficiently greater than the minimum train shunt resistance to enable the track relay to be held after it is once picked up, our circuit provides positive operation, because the momentary excess or impulse current is sufficiently greater than the normal current to insure pick-up of said track relay. The current limiting resistance 15 is always in circuit, so that no excessive current can be applied to the track, and no excessive drain on the batteries can occur. There is no possibility of a false clear signal, because, with the resistance 15 always in the track circuit, the track relay will always be released by a train shunt even if the slow release relay 11 should fail to release and the impulse voltage be continuously applied to the track. Any loose connection, wire or insulation failure, or faulty contact at either relay will either open the track circuit or nullify the impulse feature, causing a continuous danger signal.

The principal feature responsible for the successful operation of the circuit is the control of the impulse or booster circuit by the combined action of the series relay 14 and the slow release relay 11. As long as the series relay remains picked-up, the booster circuit cannot be put in series with the track circuit. The only time such series connection can occur is immediately after the series relay 14 releases and before the slow-release relay has had time to release.

We claim as our invention:

1. In a railway signal system, the combination with a track circuit comprising the rails of a block of track, a signal operating track relay, a battery and a second relay, of an auxiliary circuit comprising a second battery and a third relay operated by said second battery, said third relay having a slower release than the said second relay, front contacts on the second relay included in said auxiliary circuit, and back contacts on the second relay and front contacts on the third relay cooperating to connect both circuits together in the interval of time between the release of the second relay and the delayed release of the third relay.

2. In a railway signal system, the combination with a track circuit comprising the rails of a block of track, a signal operating track relay, a battery, and the winding of a second relay, of a third relay having a slow release characteristic, said third relay having back contacts normally included in said track circuit, a second battery, an auxiliary circuit including the second battery and the winding of the third relay and front contacts of the second relay, other front contacts on the second relay for shunting the back contacts of the third relay and back contacts on the second relay and front contacts on the third relay cooperating to connect the second battery in the track circuit during the interval of time between the release of the second and third relays.

DAVID W. DOWER.
AUGUSTUS W. CLARK.